United States Patent

[11] 3,545,818

| [72] | Inventor | John Walter Davis<br>Coventry, England |
|---|---|---|
| [21] | Appl. No. | 820,990 |
| [22] | Filed | May 1, 1969 |
| [45] | Patented | Dec. 8, 1970 |
| [73] | Assignee | The Dunlop Company Limited<br>London, England<br>a corporation of Great Britain |
| [32] | Priority | May 3, 1968 |
| [33] | | Great Britain |
| [31] | | No. 20986/68 |

[54] CONTROL VALVES
14 Claims, 2 Drawing Figs.

[52] U.S. Cl. ................................................. 303/21, 137/102,
303/40, 303/61, 303/68, 303/69
[51] Int. Cl. ........................................................ B60t 15/00,
B60t 8/00
[50] Field of Search............................................. 137/102;
303/21, 68—69, 61—63, 40.6

[56] References Cited
UNITED STATES PATENTS

| 2,893,381 | 7/1959 | Black ............................ | 137/102X |
|---|---|---|---|
| 3,070,108 | 12/1962 | Fischer......................... | 137/102X |
| 3,188,148 | 6/1965 | Eaton............................ | 303/21 |

FOREIGN PATENTS

| 518,431 | 2/1940 | Great Britain................ | 137/102 |

Primary Examiner—Milton Buchler
Assistant Examiner—John J. Mclaughlin, Jr.
Attorney—Jeffers & Young ABSTRACT: Solenoid operated control valve for a vehicle antiskid system having a valve member supported in a valve chamber by means of two spaced apart flexible annular diaphragms, one diaphragm having apertures formed therein to permit flow of fluid from one side to the other side of the diaphragm.

CONTROL VALVES

This invention relates to fluid-flow control valves, for example for use in pneumatic systems.

A control valve in a vehicle antiskid braking system, for example as described in the specification of our U.S. Pat. No. 3,411,835, may be arranged in the system so as to control the supply of compressed air to a brake-releasing chamber of a brake actuator, the valve being designed to have a brake-applying position in which the brake-releasing chamber is connected to atmosphere and a brake-releasing position in which the brake-releasing chamber is connected to a source of pneumatic pressure.

One object of the present invention is to provide a control valve, particularly for use in a vehicle antiskid braking system, which will respond quickly to actuation by electrical means when a vehicle is about to skid.

According to the invention, a fluid-flow control valve comprises a valve body, a valve chamber formed within the valve body, and a valve member supported within the valve chamber by means of first and second axially spaced-apart flexible annular diaphragms secured at their outer peripheries to the valve body and at their inner peripheries to the valve member, the first diaphragm acting to provide a seal to the valve chamber, and the valve member being arranged to be axially movable between a first position in which the valve member makes sealing engagement with a first valve seat on one side of the second diaphragm and a second position in which the valve member makes sealing engagement with a second valve seat on the other side of the second diaphragm.

The valve member may be spring-loaded towards one position, or alternatively the first diaphragm may be arranged so as to provide a residual force urging the valve member to one position when the valve chamber is under pressure. The spring-loading, where such means is provided, may take the form of a coiled compression spring acting between an abutment in the valve chamber and a portion of the valve member, or alternatively one of the diaphragms may be arranged to provide the required axial spring thrust.

The diaphragms may be of rubber or other resilient plastics material such as nylon, or alternatively metallic diaphragms may be employed.

According to the invention also, a vehicle antiskid braking system comprises a fluid-flow control valve of the kind described above.

Two embodiments of the invention will now be described by way of example with reference to the accompanying drawings in which.

Figure 1:
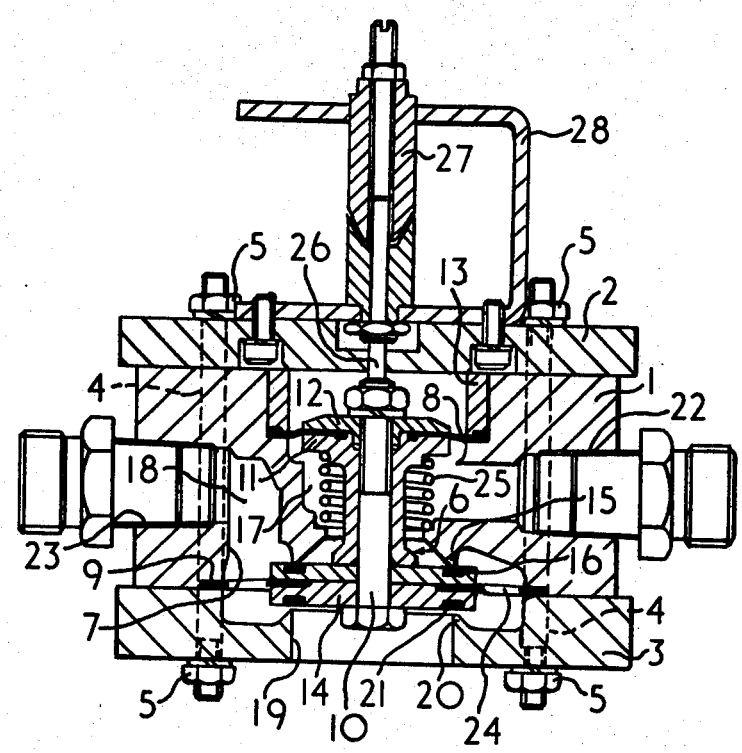
FIG. 1 is a diagrammatic axial cross-sectional view of a control valve according to the invention.

In the first embodiment as seen in FIG. 1 a fluid flow control valve for a system of the kind described in our U.S. Pat. No. 3,411,835 comprises a valve body formed from a hollow cylindrical housing 1 and a pair of end plates 2, 3 secured to the housing 1 by means of tie rods 4 passing through bores formed in the housing 1 and the end plates 2,3 and having screw threaded ends engaging nuts 5.

A valve member 6 is supported within the valve chamber 7 defined by the inner periphery of the housing 1, by means of first and second flexible annular diaphragms 8,9 formed from polyurethane, each diaphragm being secured at its outer periphery to the housing 1 and at its inner periphery to the valve member 6.

The valve member 6 is axially movable within the valve chamber 7 and comprises a valve stem 10 in the form of a bolt. The bolt is provided with a sleeve 11 and the inner periphery of the first diaphragm 8 is clamped between one end of the sleeve 11 and an end piece 12 mounted on the threaded end of the bolt 10. The outer periphery of the first diaphragm 8 is secured against an annular shoulder formed within the chamber 7 by means of a hollow cylindrical spacer member 13 which is pressed axially towards the shoulder when the end plate 2 is secured to the housing 1.

A valve head 14 formed in two parts is secured between the head of the bolt 10, and the sleeve 11.

The inner periphery of the second diaphragm 9 is clamped between the two parts of the valve head 14 and the outer periphery of the second diaphragm 9 is clamped between the end plate 3 and the housing 1.

The inner periphery of the housing 1 is shaped to provide a first valve seat 15 engageable with a resilient closure member 16 in the form of a rubber ring embedded in the valve head 14. The first valve seat 15 divides the valve chamber 7 into a first portion 17 which is sealed at one end by the first diaphragm 8 and a second portion 18.

The end plate 3 is provided with a central opening 19 bounded by a second valve seat 20 which is engageable with a second resilient closure member 21 in the form of a rubber ring embedded in the valve head 14.

Two valve ports 22,23 are formed in the housing communicating respectively with the two portions 17,18 of the valve chamber 7.

The valve member 6 is movable between two positions: a first position in which the valve head 14 makes sealing engagement with the first valve seat 15; and a second position in which the valve head 14 makes sealing engagement with the second valve seat 20. The second diaphragm 9 is provided with a plurality of apertures 24 and in the first position fluid can flow between the second portion 18 of the valve chamber 7 and the opening in the end plate. In the second position fluid can flow between the first and second portions 17,18 of the chamber 7.

A coiled compression spring 25 coaxially surrounding the valve stem 10 and arranged between an abutment surface formed on the portion of the inner periphery of the housing 1 providing the first valve seat 15 and the sleeve 11, urges the valve member 6 into the first position.

A push rod 26 passing slidably through an axial bore formed in the end plate 2 is secured to a plunger 27 slidably mounted within a solenoid (not shown) mounted within a yoke 28 secured to the end plate 2. The push rod 26 is arranged in contact with the threaded end of the bolt 10 so that operation of the solenoid causing the push rod 26 to be moved inwardly relative to the valve chamber 7 causes the valve member 6 to be moved from the first position to the second position. The spring 25 acts to return the valve member 6 to the first position when the solenoid ceases to operate.

When the control valve is employed in a system of the kind described in our copending U.K. Pat. application No. 29,998/65 an inlet pipe is provided to supply compressed air to the valve chamber 7 through valve port 22 and the opening 19 in the end plate 3 is exposed to atmospheric pressure.

An outlet pipe is connected to the valve port 23 to link the second portion 18 of the valve chamber 7 with the brake-releasing chamber of a brake actuator (not shown).

In the first position of the valve member 6 the second portion 18 of the valve chamber 7 is open to the atmosphere through the apertures 24 in the second diaphragm 9 and the opening 19 in the end plate 3 and the associated brake can be applied. In the second position of the valve member 6 the valve member 6 is moved into sealing engagement with the second valve seat 20 and pressurized air can flow from the portion 17 of the valve chamber 7 to the portion 18 of the valve chamber 7 and through the outlet pipe connected to valve port 23 to effect release of the brake.

It will be noted that in the arrangement described above the first valve seat 15 and the second valve seat 20 are open simultaneously during the period when the valve member 6 is moving from one position to the other. It has been found, however, that if the actuating thrust from the solenoid and the return spring loading are sufficiently great relative to the mass of the valve member 6 the valve member will move so rapidly from the position in which the first seat 15 is closed to the position in which the second seat 20 is closed and vice versa that there is very little loss of air pressure through the second valve seat 20 during the period of movement of the valve member 6.

That valve is arranged so that air pressure acting on the first diaphragm 8 balances the pressure acting on the side of the head 14 exposed to pressure within the first portion 17 of the valve chamber 7 and this also improves the speed of response of the valve to the actuating thrust.

Figure 2:
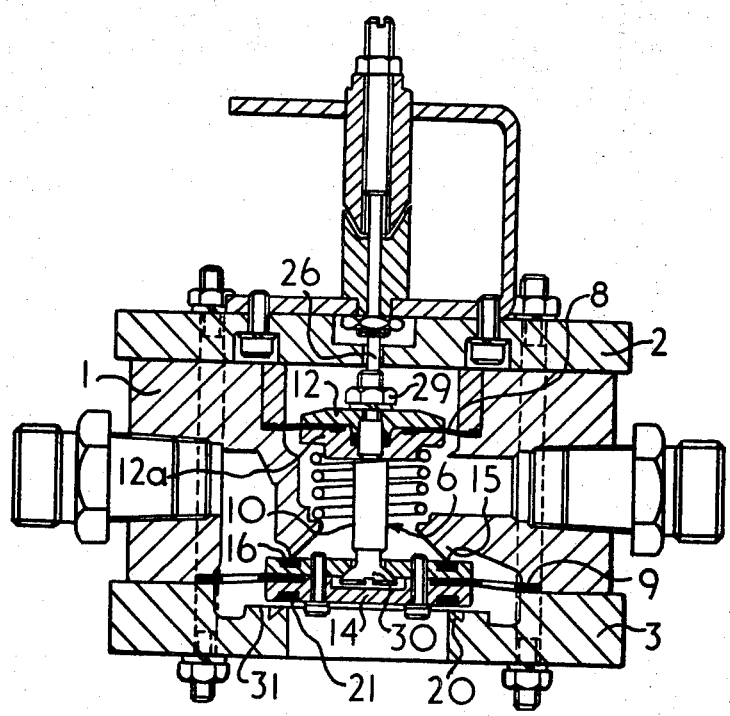
FIG. 2 is a diagrammatic axial cross-sectional view of an alternative control valve according to the invention.

In an alternative valve in accordance with the invention as seen in FIG. 2, the valve member 6 comprises a valve stem 10 in the form of a bolt. The inner periphery of the first diaphragm 8 is clamped between two end pieces 12,12a mounted on the threaded end of the bolt 10 and secured in position between a nut 29 and an enlarged central portion of the bolt 10.

The inner periphery of the second diaphragm 9 is clamped between the two parts of a valve head 14 secured to the head 30 of the bolt 10.

The head 30 of the bolt 10 is part spherical in form and engages a part spherical recess formed in the valve head 14 to provide a universally movable joint for the valve head 14.

With this arrangement any tendency for misalignment of the valve member 6 to cause the valve to open inadvertently is eliminated, since the valve head 14 is free to align itself with the first and second valve seats 15,20 independently of the alignment of the valve stem 10.

In the embodiments described above the first and second valve seats 15,20 may be of sharp-edged profile to provide a good seal with the rubber closure members 16,21, but in order to protect the closure members from damage by the sharp-edged seats it may be desirable to form annular or part annular stop surfaces around the seats for engagement with corresponding surfaces on the valve member head, thus preventing excessive indentation of the closure members by the valve seats. This arrangement is particularly desirable on the second valve seat.

In the embodiment shown in FIG. 2 an annular stop surface 31 is provided around the second valve seat 20.

I claim:

1. A fluid-flow control valve comprising a valve body, a valve chamber formed within the valve body, and a member supported within the valve chamber by means of first and second axially spaced-apart flexible annular diaphragms secured at their outer peripheries to the valve body and at their inner peripheries to the valve member, the first diaphragm acting to provide a seal to the valve chamber, and the valve member being arranged to be axially movable between a first position in which the valve member makes sealing engagement with a first valve seat on one side of the second diaphragm and a second position in which the valve member makes sealing engagement with a second valve seat on the other side of the second diaphragm.

2. A valve according to claim 1 wherein the second diaphragm is provided with at least one aperture to permit flow of fluid from one side of the second diaphragm to the other side.

3. A valve according to claim 1 wherein the valve chamber is divided into first and second portions by the first valve seat, the valve member engaging the first valve seat in the first position of the valve member to prevent flow of fluid between the two portions of the valve chamber.

4. A valve according to claim 3 wherein the second portion of the valve chamber is provided with an opening bounded by the second valve seat, the valve member engaging the second valve seat in the second position of the valve member to prevent flow of fluid between the second portion of the chamber and the opening.

5. A valve according to claim 3 wherein the first diaphragm acts to provide a seal to the first portion of the valve chamber and is arranged so that fluid pressure within the first portion acts on the first diaphragm to urge the valve member towards the first position.

6. A valve according to claim 5 wherein the thrust exerted on the valve member due to fluid pressure acting on the first diaphragm is substantially equal to the thrust exerted on the valve member due to fluid pressure acting on the valve member.

7. A valve according to claim 5 wherein the thrust exerted on the valve member due to the fluid pressure acting on the first diaphragm exceeds the thrust exerted on the valve member due to fluid pressure acting on the valve member.

8. A valve according to claim 1 wherein the valve member is spring-urged towards the first position.

9. A valve according to claim 1 incorporating a solenoid arranged to effect axial movement of the valve member towards the second position when actuated.

10. A valve according to claim 9 wherein a push rod is arranged to transmit a thrust from the solenoid to the valve member to effect the said axial movement of the valve member.

11. A valve according to claim 10 wherein the solenoid is mounted on the outer surface of the valve body and the push rod extends through a bore formed in the valve body.

12. A valve according to claim 1 wherein the valve member comprises a valve stem having a valve head at one end for sealing engagement with the first and second valve seats.

13. A valve according to claim 12 wherein the valve head is connected to the valve stem by means of a universally movable joint.

14. A vehicle antiskid braking system comprising a fluid flow control valve as claimed in claim 1.

PO-1050
(5/69)

UNITED STATES PATENT OFFICE
CERTIFICATE OF CORRECTION

Patent No. __3,545,818__ Dated __12-8-70__

Inventor(s) __John Walter Davis__

It is certified that error appears in the above-identified patent and that said Letters Patent are hereby corrected as shown below:

Column 3, line 39; The word "valve" (third occurrence)

has been omitted; line 39 should read:

"valve chamber formed within the valve body, and a valve member"

Claim 1, line 2

Signed and sealed this 23rd day of March 1971.

(SEAL)
Attest:

EDWARD M. FLETCHER, JR.
Attesting Officer

WILLIAM E. SCHUYLER, JR
Commissioner of Patent